United States Patent [19]

Wood

[11] 3,892,696

[45] July 1, 1975

[54] POLYUREAS AND PREPARATION THEREOF

[75] Inventor: Louis L. Wood, Potomac, Md.

[73] Assignee: W. R. Grace & Co., New York, N.Y.

[22] Filed: May 12, 1972

[21] Appl. No.: 252,793

[52] U.S. Cl.... 260/29.2 TN; 260/32.8 N; 260/77.5 CH
[51] Int. Cl......................... C08g 22/00; C08g 51/34
[58] Field of Search... 260/32.8 N, 29.2 TM, 77.5 CH

[56] References Cited
UNITED STATES PATENTS

| | | | |
|---|---|---|---|
| 3,412,054 | 11/1968 | Milligan | 260/29.2 TN |
| 3,462,470 | 8/1969 | Emery | 260/77.5 CH |
| 3,682,867 | 8/1972 | Shackelford | 260/77.5 CH |

Primary Examiner—Theodore Morris
Attorney, Agent, or Firm—Eugene M. Bond

[57] ABSTRACT

The invention disclosed is a method for preparing new improved polyureas from polyisocyanates and polyamines. The product polyureas are characteristically tough, abrasion resistant resins having broad spectrum utility.

11 Claims, No Drawings

POLYUREAS AND PREPARATION THEREOF

This invention relates to a method for preparing new improved polyureas. More particularly, the present invention provides tough, abrasive resistant polyureas from polyisocyanates and polyamines.

It is known in the prior art that attempts to prepare ureas by reaction of isocyanates with amines proceeds rapidly and energetically and that application in polymerization reactions, i.e., reactions of polyisocyanates with polyamines generally, does not result in desirable soluble thermoplastics. Instead, various complex branched, crosslinked, non-soluble, non-thermoplastic gels typically form during the reaction. It has now been found, however, that by practice of the present invention, reactions of polyisocyanates with polyamines are possible when moderated by a non-protonic carbonyl containing solvent such as a ketone or aldehyde solvent.

Generally stated, the present invention provides new improved polyureas prepared by reacting polyisocyanates with polyamines in a reaction moderating solvent. The resultant reactant mixture of non-crosslinked polyureas may then be disposed as desired with final curing, i.e., by use of a crosslinking agent; by application of external energy such as heat, oxidative environments and the like; and usually accompanied by removal of the reaction moderating solvent. The cured crosslinked polyureas are characteristically tough, abrasion resistant resins having broad spectrum utility.

Recognizing that the present reaction mechanism may be subject to speculation, it appears that the present reaction proceeds because the moderating solvent such as ketone or aldehyde solvents form complexes or weakly bonded compounds with polyamines thus slowing down what otherwise would be an instantaneous reaction with isocyanates. The mechanism thus appears as follows:

Equation I

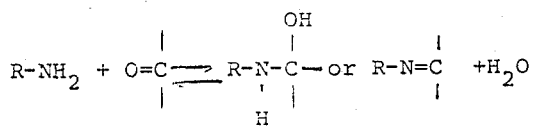

The interaction of the moderating solvent is easily reversed and any amine groups which have not reacted with isocyanates are readily available for subsequent and more highly desirable reactions.

Polyamines, such as diethylene triamine, may be reacted with from equal molar amounts to large excesses of a moderating solvent such as ketone or aldehyde solvents. Examples of these solvents include acetone, methyl ethyl ketone, cyclohexanone, acetaldehyde, propionaldehyde, butyraldehyde, isobutyraldehyde and the like. The reaction preferably may be effected for times ranging from about 2 minutes to about 24 hours, i.e., aging at a temperature of about −5°C. to about 150°C. To the resultant solution then maintained at a temperature of about 0°C. to about 25°C. is added a cold solution of polyisocyanate at a temperature in the range of about 0°C. to about 25°C. disposed in a similar solvent. The molar ratio of amine groups to isocyanate groups is from about 1:1 or larger amounts to about 1:20 of amine groups as desired. Usually, it is desirable to include an excess of polyamine over the isocyanate such that the resultant polyureas contain free amino groups available for many supplemental reactions.

After stirring the reactants at about 0°C. to about 100°C. for about 2 minutes to about 8 hours, polymerization is complete and the resultant solution or slurry of essentially non-crosslinked polyureas is ready for subsequent fabrication, curing or applications as desired.

A broad spectrum of useful applications are possible for the present polyureas containing available amino groups. These applications are based on the ability of the present polyureas to form crosslinkable stable polymer solutions, which, after proper formulation, and upon drying, i.e., removal of the solvent, cure by crosslinking to give tough insoluble resins useful for impregnants, coatings or films and the like.

Of significant commercial importance are those polyurea products which are soluble or dispensible in aqueous media. For example, these systems are useful for polyurea/amine adducts involving epichlorohydrin or formaldehyde as follows:

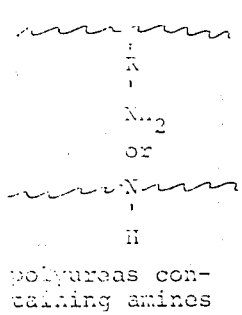

polyureas containing amines

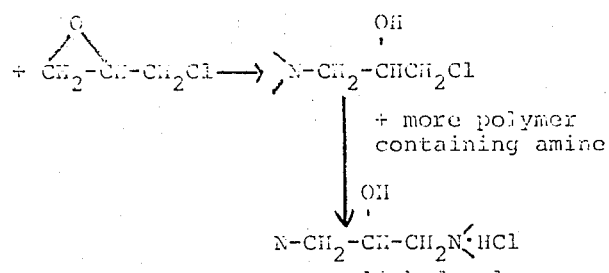

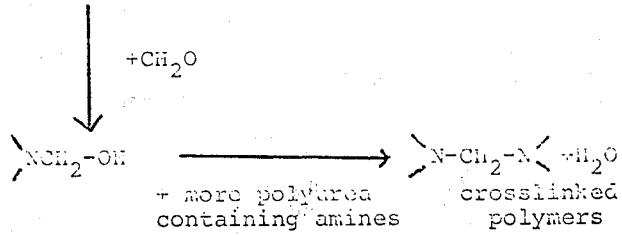

These adducts may be formed in generally two steps. First, the epichlorohydrin or formaldehyde may be attached to a single amino group in the polyurea chain at pH below 8.0 and/or dilute solutions in water or carbonyl containing solvents, with little or no crosslinking. Upon adjusting the pH above 8 and/or removing the solvent, a second crosslinking step takes place resulting in a tough, insoluble resin.

Examples of monomeric polyisocyanates useful herein include polyisocyanates and polyisothiocyanates which are PAPI-1 (a polyaryl polyisocyanate as defined in U.S. Pat. No. 2,683,730) tolylene diisocyanate, triphenylmethane-4,4'4", -triisocyanate, benzene-1,3,5-triisocyanate, toluene-2,4,6-triisocyanate, diphenyl-2,4,4'-triisocyanate, hexamethylene diisocyanate, xylylene diisocyanate, chlorophenylene diisocyanate, diphenylmethane-4,4'-diisocyanate, naphthalene-1, 5-diisocyanate, xylene-alpha,alpha'-diisothiocyanate, 3,3'-3,3'-dimethyl-4, 4'-biphenylene diisocyanate, 3,3'-dimethoxy-4, 4'-biphenylene diisocyanate, 2,2',5,5'-tetramethyl-4, 4'-biphenylene diisocyanate, 4,4'-methylenebis (phenylisocyanate), 4,4'-sulfonylbis (phenylisocyanate), 4,4'-methylene di-ortho-tolylisocyanate, ethylene diisocyanate, ethylene diisothiocyanate, trimethylenediisocyanate and the like. Mixtures of any one or more of the above mentioned organic isothiocyanates or isocyanates may be used as desired. The aromatic diisocyanates and polyisocyanates or mixtures thereof which are expecially suitable are those which are readily commercially available, have a high degree of reactivity and a relatively low cost. Also, polymeric polyisocyanates are especially useful in the practice of this invention, such as illustrated subsequently.

Examples of polyamines useful herein include, without limitation, molecules having two or more amine members, including hydrazine. These amine members may be ordinarily attached to either aliphatic or aromatic molecules. Typically, the polyamines are those molecules having from about 2 to about 23 pendant amines. Specific examples of polyamines include but are not limited to materials such as diethylenetriamine, triethylene-tetramine, tetraethylenepentamine, polyethyleneimine, tolylene-2,4,6-triamine, ethylene diamine, N,N'-dimethylethylene diamine, trimethylenediamine, tetramethylenediamine, pentamethylenediamine, hexamethylenediamine, and the like. Other suitable polyamines include propylene diamine, dipropylene triamine, 1,3 diamino butane and the like. They are considered as members of the broad class of alkylene polyamines. Ordinarily the word "polyamine" is employed to include diamines, as well as amines having three or more nitrogens.

The systems of the present invention are particularly useful in wet and dry strength improvement additives for paper, impregnants, and bonding agents for paper fiber webs, and for non-woven and woven natural or synthetic fabrics; adhesives for films, foils, fabrics, fibers, tire cords, elastomers, leather, plastics, wood, ceramics, cellulosics, metals, non-wovens, and glasses; shrinkproofing of textiles; intermediates in the preparation of water-soluble cationic polyelectrolytes; surface primers; hydrophilic surface sizing; coating and modifying agents for woven and non-woven fibers and fabrics; bulking agents and stiffeners for webbings; retention aids; coagulants and flocculents; crosslinking agents for epoxy resins, isocyanated carboxylated, and halogenated polymers; protective and decorative coatings; molded articles; reactive intermediates for synthesis of flame retardants, soil release agents, fabric softeners, permanent press resins, dyeing assist agents and the like.

The following examples will aid in explaining, but should not be deemed as limiting, practice of the present invention. In all cases, unless otherwise noted, all parts and percentages are by weight.

EXAMPLE 1

1000 grams polyoxyethylene glycol having a weight average molecular weight of 1000 was outgassed by stirring at 110°C. for about 3–5 hours. The remaining glycol having a weight of about 980 grams was cooled to 50°C. and then added as a liquid over a period of 15–20 minutes under an inert nigrogen atmosphere, to 326 grams of tolylene diisocyanate. The tolylene diisocyanate had 80% by weight of the 2,4 isomer, and 20% by weight of the 2,6 isomer. The reaction temperature was maintained between about 50°C. and 60°C. with stirring continuing for 3–5 hours. Isocyanate capped polyoxyethylene glycol was recovered from this reaction.

EXAMPLE 2

A solution of 103 grams of diethylene triamine in 500 ml dry acetone was stirred at 60°–65°C. under a dry nitrogen atmosphere for 2 hours. The resultant solution was cooled to 5°C. to 10°C. Next, 980 grams of isocyanate capped polyoxyethylene glycol prepared in Example 1 in 1000 ml. dry acetone at 50°–10°C. was added, with good stirring. The resultant clear, pale yellow solution was stirred at 10°–15°C. for 2 hours. The product solution was next warmed to 60°–70°C., and approximately three-fourths of the acetone representing about 1100 ml was removed by distilling the solution. To keep the product fluid, 1000 ml water was added and most of the remaining acetone representing about 300–400 ml was distilled at less than 80°C. The remaining yellow product syrup was diluted to 20° solids content by adding 4400 ml water. A non-crosslinked amino-containing polyurea polymer in solution having a pH 9.5 was recovered.

EXAMPLE 3

5400 grams of the aqueous polyurea polyamine polymer solution recovered in Example 2 was warmed to 60°C. 555 grams of epichlorohydrin were added to the aqueous prepolymer solution over a period of about 5 minutes with good stirring. The resultant solution was stirred at 60°C. for about 1–4 hours until the Brookfield viscosity at 25° reached 500–600 cps. A turbid tan colored product resulted which was then diluted with 12,400 ml. cold water. The diluted product solution was cooled to 25°C. after which the pH was adjusted to 5.5 using dilute aqueous hydrochloric acid. Twenty grams of this product solution were dried at 100°C. for 1 hour to give 2 grams of a brown, tough elastomeric film which proved to be insoluble in water.

EXAMPLE 4

100 grams of the product prepared by the procedure of Example 2 were mixed with 50 grams, 37% by weight aqueous formaldehyde solution. A water insoluble gel precipitated which upon drying, gave a fairly tough elastomer.

EXAMPLE 5

A triisocyanate was prepared by reacting a solution of 110 grams of a water soluble triol having a weight average molecular weight of about 3300, and a 2:1 ratio of ethylene oxide/propylene oxide, 17.4 grams of the tolylene diisocyanate from Example 2. The reaction was stirred at 50°C. to 60°C. for 4 hours whereupon a clear, colorless syrup identified as a polymeric triisocyanate was recovered. This product remained fluid at 25°C.

EXAMPLE 6

A solution was prepared by adding 3.4 grams of diethylene triamine to 50 ml of acetone while stirring for 2 hours at 50°C. to 60°C. The resultant colorless solution was cooled to 5°C. Next, a 10°C. chilled solution of 42.4 grams of the polymeric triisocyanate prepared in Example 5 in 50 ml acetone was added. The resulting reaction was stirred for 1 hour at a temperature of 5°C. to 15°C. and then for 30 minutes at 25°C. After about 75 ml of acetone were removed at a temperature of about 50°–60°C., 150 ml water were added. Thereafter, 20 ml additional acetone was removed at 50°C. to 60°C. A brown polymer solution having a pH of 9.5 was recovered.

EXAMPLE 7

67 grams of epichlorohydrin were added to 527 grams of the reaction product recovered as described in Example 6 in 1500 ml water. The resultant turbid slurry was stirred at 60°C. for 2.5 hours whereupon the pH was noted to be 5.5. To this slurry was added 320 ml water. Twenty grams of this product were dried at 100°C. for 1 hour and give 2 grams of a tan, tough elastomeric film which was insoluble in water.

EXAMPLE 8

A solution of 1.69 grams (0.0282 mole) of ethylene diamine in 50 grams acetone was placed in a 500 cc. resin kettle fitted with a stirrer, condenser, dropping funnel and gas inlet. The kettle was flushed with dry nitrogen and a solution of 25 grams (0.028 mole) of a poly(tetramethylene oxide) diol capped with isocyanate having a molecular weight of 890, in 25 grams benzene was added dropwise without heating or cooling the reaction mixture. Shortly after the reaction was complete, the homogeneous solution started to set up as a gel after which gelatinous precipitate separated from the solvent. The precipitate did not dissolve in 50 cc. additional acetone. The solvent was decanted and the precipitate was mixed with dry ice, broken up in a blender and dried under vacuum. The recovered product was readily molded in a hydraulic press at 325°F. No infusible gel structure appeared during repeated pressing. A clean, flexible sheet was recovered which when tested was found to have a tensile strength of 2,770 psi and an ultimate elongation of 350%.

EXAMPLE 9

The procedure of Example 8 was repeated using a solution of 25 grams (0.028 mole) of the isocyanate capped diol in 25 grams benzene, which was added to a solution of 2.9 grams of diethylene triamine in 50 cc. acetone. The product solution appeared to set-up as a gel. The solvent was taken off under vacuum and the product was compression molded. Again the product appears to be completely thermoplastic, had a tensile strength of 1.940 psi, and an ultimate elongation of 340%.

EXAMPLE 10

In order to demonstrate the use of a hydrophobic polyol which has been capped with an aliphatic diisocyanate and reacted with a polyamine in a carbonyl containing solvent, 1025 grams (1 mole) of polypropylene glycol having a weight average molecular weight of 1025 and previously outgassed at 110°C. and 10 Torr, was combined with 560 grams (2 moles) of dicyclohexyl-4,4'-diisocyanate. The reaction was stirred at 60° to 70°C. for 6 hours whereupon the isocyanate content of the product reached a constant value of 1.23 meq. NCO/gram relative to theory of 1.26 meq./gram.

A solution of 14.6 grams (0.1 mole) triethylene tetramine in 50 grams methyl ethyl ketone was stirred at 25°C. for 16 hours. To the resultant solution 15°C. was added with good stirring over a period of 20 minutes a solution of 119 grams (0.075 moles) of the above diisocyanate in 150 grams of methyl ethyl ketone. The reaction was stirred at 70°C. for 45 minutes. Next 180 grams methyl ethyl ketone was distilled at 80°–50°C. at 760 to 10 Torr. A yellow product syrup resulted which was diluted with 120 grams of water to make a 50 percent solids solution having 1.02 meq. amine/gram relative a theory value of 0.94 meq. —NH/gram. To this solution was added 16 grams (0.125 mole) of trans-1,4-dichlorobutene-2. The reaction was stirred at 60°C. for 30 minutes and the resultant cloudy product syrup was poured onto a shallow glass dish. After drying in air at 25°C. for 24 hours, a resultant clear tough elastomer was recovered which was found to be insoluble in water.

EXAMPLE 11

In order to demonstrate capping of a low molecular weight monomeric polyisocyanate with a polyfunctional amine to form a useful polyamine, a solution of 18.0 grams (0.3 mole) ethylene diamine in 150 grams acetone was heated at 70°C. for 2 hours. To the resultant solution at 10°C. was added over a period of 30 minutes with good stirring a solution of 250 grams acetone containing 40 grams (0.1 mole) of a commercial polymethylene polyphenylisocyanate having an approximate isocyanate equivalent of 133.5. The resultant yellow reaction solution was heated to 50°C. for 45 minutes. The resultant yellow orange solution contained 15 percent solids and had an amine content of 0.8 meq./gram.

To 50 grams of a liquid epoxy resin prepolymer made from disphenol A and epichlorohydrin plus sodium hydroxide was added 25 grams of the acetone solution of the polyamine. Upon standing in air at 25°C. for 16 hours the reaction solution became a clear tough solid insoluble film.

Thus, the method of this invention provides a means for preparing improved polyureas from polyisocyanates and polyamines using from about 1% to about 75% by weight of a reaction moderating solvent based upon the weight of the reactants. The polyisocyanate may be added along with the reaction moderating solvent, the polyamine may be added along with the reaction moderating solvent, or each may be separately added to the moderating solvent.

EXAMPLE 12

A 100 gram sample of the non-crosslinked reaction product of Example 7 was removed at hour intervals as follows:

| Hour | Solution | pH | Brookfield Viscosity at 25°C. (centipoises) |
|---|---|---|---|
| 1 | yellow | 5.5 | 74 |
| 2 | yellow | 5.5 | 100 |
| 3 | yellow | 5.5 | 125 |
| 4 | yellow | 5.5 | 200 |

The above water soluble samples were made into 250 ml. solutions of 10% solids and 250 ml. water solutions of 1% solids. Four 60 ml. portions of each solution were soaked into four Whatman No. 1 papers (6 × 6 inches) and each paper was allowed to drain 3 minutes. Each paper was pressed between two sheets of untreated Whatman No. 1 paper by two passes in 90° directions with a 16 lb. roller. Two sheets of each formulation were cured in the oven at 105°C. for 1 hour (cured). The rest of the papers were dried at 25°C. for 24 hours (uncured). The wet and dry tensile strengths of the papers were measured according to ASTM 828, 829. The results are presented in Table I.

TABLE I

| Hour | Sample | | lbs./in width WET | DRY |
|---|---|---|---|---|
| 1 | 1% | uncured | 1.54 ± 0.05 | 6.79 ± 0.17 |
|   | 1% | cured | 1.95 ± 0.15 | 7.13 ± 0.12 |
| 2 | 10% | uncured | 0.513 ± 0.04 | 9.35 ± 0.90 |
|   | 10% | cured | 2.00 ± 0.43 | 13.1 ± 0.30 |
|   | 1% | uncured | 1.45 ± 0.02 | 6.98 ± 0.20 |
|   | 1% | cured | 1.89 ± 0.08 | 7.83 ± 0.20 |
| 3 | 10% | uncured | 3.76 ± 0.16 | 14.9 ± 0.06 |
|   | 10% | cured | 6.97 ± 0.57 | 14.9 ± 0.24 |
|   | 1% | uncured | 2.64 ± 0.06 | 7.31 ± 0.27 |
|   | 1% | cured | 5.21 ± 0.32 | 8.32 ± 0.11 |
| 4 | 10% | uncured | 10.0 ± 0.23 | 23.1 ± 0.66 |
|   | 10% | cured | 10.6 ± 0.25 | 14.7 ± 0.34 |
|   | 1% | uncured | 2.22 ± 0.03 | 7.61 ± 0.19 |
|   | 1% | cured | 4.29 ± 0.20 | 13.3 ± 0.81 |
|   | 0.10% | cured | 2.23 ± 0.27 | 11.5 ± 0.39 |
|   | 0.01% | cured | 0.714 ± 0.08 | 10.8 ± 0.71 |
|   | 0.0 | (distilled H₂O cured) | 0.391 ± 0.17 | 11.4 ± 0.66 |

These results clearly show the improved wet strength of the paper treated with the polyurethane-epichlorohydrin product over the untreated paper.

It is understood that the foregoing detailed description is given merely by way of illustration and that many variations may be made therein without departing from the spirit of this invention.

What is claimed is:

1. A method for preparing aqueous polyurea solution which consists essentially of preparing a non-crosslinked polyurea by reacting a first component comprising polyisocyanate selected from the group consisting of polyaryl polyisocyanate, tolylene diisocyanate, triphenylmethane-4,4'4'',-triisocyanate, benzene-1,3,5-triisocyanate, toluene-2,4,6-triisocyanate, diphenyl-2,4,4'-triisocyanate, hexamethylene diisocyanate, xylylene diisocyanate, chlorophenylene diisocyanate, diphenylmethane-4,4'-diisocyanate, napthalene-1,5-diisocyanate, xylene-alpha,alpha'-diisothiocyante, 3,3'-dimethyl-4, 4'-biphenylene diisocyanate, 3,3'-dimethoxy-4, 4'biphenylene diisocyanate, 2,2',5,5'-tetramethyl-4,' 4'-biphenylene diisocyanate, 4,4'-methylenebis (phenylisocyanate)c 4,4'-sulfonylbis (phenylisocyanate), 4,4'-methylene di-ortho-tolylisocyanate, ethylene diisocyanate, ethylene diisothiocyanate, trimethylenediisocyanate and the like; and a second component comprising polyamine having from about 2 to about 23 pendant amine groups in a non-protonic carbonyl containing solvent selected from the group consisting of acetone, methyl ethyl ketone, cyclohexanone, acetaldehyde, propionaldehyde, butyradelhyde, and isobutyraldehyde; said polyamine and said solvent being first combined for from about 2 minutes to about 24 hours at a temperature of −5°C. to about 150°C.; the molar ratio of isocyanate groups in the polyisocyanate to amine groups in the polyamine being from about 1:1 to about 1:20 isocyanate to amine; adding water and removing the solvent from the non-crosslinked polyurea.

2. The method of claim 1 wherein curing of the non-crosslinked polyurea is effected by removing the added water thereby preparing a tough insoluble crosslinked polyurea.

3. The aqueous polyurea composition prepared by the method of claim 1.

4. The tough insoluble crosslinked polyurea prepared by the method of claim 2.

5. The method of claim 1 wherein an intermediate crosslinking agent is introduced into the aqueous non-crosslinked solution, said crosslinking agent being a member of the group consisting of epichlorohydrin, formaldehyde, 1,4-dichlorobutene, B,B'-dichloroethylether, acetaldehyde, chloral and the like.

6. The method of claim 5 wherein curing of the non-crosslinked polyurea is effected by removing the added water thereby preparing a tough insoluble crosslinked polyurea.

7. The aqueous polyurea composition prepared by the method of claim 5.

8. The tough insoluble crosslinked polyurea prepared by the method of claim 6.

9. The method of claim 1 wherein after polyamine and said solvent are first combined for from about 2 minutes to about 24 hours at a temperature of about −5°C. to about 150°C., the resultant combination is maintained at a temperature of about 0°C. to about 25°C. during which said polyisocyanate at a temperature in the range of about 0°C. to about 25°C. is added.

10. The method of claim 1 wherein the product is stirred at about 0°C. to about 100°C. for about 2 minutes to about 8 hours to effect polymerization to essentially non-crosslinked polyureas.

11. The method of claim 1 wherein the polyamine is selected from the group consisting of diethylene-triamine, triethylene-tetramine, tetraethylenepentamine, polyethyleneimine, tolylene-2,4,6-triamine, ethylene diamine, N,N'-dimethylethylent diamine, trimethylenediamine, tetramethylenediamine, pentamethylenediamine, hexamethylenediamine, propylene diamine, dipropylene triamine, 1,3 diamino butane and the like.

* * * * *